US012661950B2

(12) United States Patent
Keldani et al.

(10) Patent No.: US 12,661,950 B2
(45) Date of Patent: Jun. 23, 2026

(54) IDENTIFYING IMPROPERLY INSTALLED EQUIPMENT IN THE HEATING AND COOLING SYSTEM OF A VEHICLE

(71) Applicant: GM GLOBAL TECHNOLOGY OPERATIONS LLC, Detroit, MI (US)

(72) Inventors: Mutaz Keldani, Oshawa (CA); Joseph F Szczerba, Grand Blanc, MI (US); Dhruv Patel, Brampton (CA); Bemnet Lulie, Victoria (CA); Kyle Holihan, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 94 days.

(21) Appl. No.: 18/609,443

(22) Filed: Mar. 19, 2024

(65) Prior Publication Data

US 2025/0296399 A1      Sep. 25, 2025

(51) Int. Cl.
  *B60H 1/00*     (2006.01)
  *B60L 58/24*    (2019.01)
(52) U.S. Cl.
  CPC ..... *B60H 1/00585* (2013.01); *B60H 1/00278* (2013.01); *B60H 1/00807* (2013.01); *B60L 58/24* (2019.02); *B60L 2240/545* (2013.01)
(58) Field of Classification Search
  CPC ........... B60H 1/00585; B60H 1/00278; B60H 1/00807; B60L 58/24; B60L 2240/545
  See application file for complete search history.

(56) References Cited

U.S. PATENT DOCUMENTS 11,774,956 B2     10/2023   Serebryakov et al.

FOREIGN PATENT DOCUMENTS

JP            2019020101 A    *   2/2019

OTHER PUBLICATIONS

Yamazaki, Heat Pump Heat Source Machine, Feb. 7, 2019, JP2019020101A, Whole Document (Year: 2019).*
German Office Action for German Application No. 102024113573. 7; dated Jan. 27, 2025; 3 pages.

* cited by examiner

*Primary Examiner* — Larry L Furdge
(74) *Attorney, Agent, or Firm* — CANTOR COLBURN LLP

(57)          ABSTRACT

Embodiments include identifying improperly installed equipment in a heating and cooling system of a vehicle. Aspects include obtaining an initial reading from each of a plurality of sensors disposed in the vehicle, activating one or more of a heating system and a cooling system disposed in the vehicle, and obtaining a series of readings from each of the plurality of sensors. Aspects also include identifying, for each of the plurality of sensors, a delta value from the series of readings, comparing, for each of the plurality of sensors, the delta value to an expected delta value, identifying two or more sensors from the plurality of sensors that have been mismatched based on differences between the delta values and the expected delta values, and updating a mapping of the two or more sensors in a software of the vehicle.

20 Claims, 10 Drawing Sheets

IDENTIFYING IMPROPERLY INSTALLED EQUIPMENT IN THE HEATING AND COOLING SYSTEM OF A VEHICLE

INTRODUCTION

The disclosure relates to the heating and cooling systems of a vehicle. More specifically, the disclosure relates to identifying improperly installed equipment in the heating and cooling systems of a vehicle.

In general, vehicles include multiple heating and cooling systems that are used to regulate the temperatures of various parts of the vehicle. The heating and cooling systems utilize a number of components such as compressors, condensers, evaporators, motors, and the like. The heating and cooling systems include a series of fluid connections between these components and one or more valves that control the flow of fluid through the fluid connections. In addition, the heating and cooling systems include a controller that controls the operation of the components and the valves to effectuate the heating and cooling of the various parts of the vehicle. The heating and cooling systems also include sensors, which are in communication with the controller, that monitor temperatures, pressures, and other characteristics of various parts of the vehicle.

Improper installation of valves or sensors of the heating and cooling systems often results in the improper operation of the heating and cooling systems. Traditional methods of diagnosing the improper operation of the heating and cooling systems are often time-consuming.

SUMMARY

In one exemplary embodiment, a method for identifying mismatched sensors in a vehicle is provided. The method includes obtaining an initial reading from each of a plurality of sensors disposed in the vehicle, activating one or more of a heating system and a cooling system disposed in the vehicle, and obtaining a series of readings from each of the plurality of sensors. The method also includes identifying, for each of the plurality of sensors, a delta value from the series of readings and comparing, for each of the plurality of sensors, the delta value to an expected delta value. The method further includes identifying two or more sensors from the plurality of sensors that have been mismatched based on differences between the delta values and the expected delta values and updating a mapping of the two or more sensors in a software of the vehicle.

In addition to the one or more features described herein the plurality of sensors are temperature sensors.

In addition to the one or more features described herein identifying two or more sensors from the plurality of sensors that have been mismatched based on the differences between the delta values and the expected delta values includes identifying a first sensor of the plurality of sensors that has a first delta value that is not within a first threshold range of a first expected delta value, identifying a second sensor of the plurality of sensors that has a second delta value that is not within a second threshold range of a second expected delta value, and determining that the first delta value is within the second threshold range of the second expected delta value and that the second delta value is within the first threshold range of the first expected delta value.

In addition to the one or more features described herein the first threshold range and the second threshold range are different.

In addition to the one or more features described herein the series of readings from each of the plurality of sensors are obtained during a predetermined time period after activation of the one or more of the heating system and the cooling system.

In addition to the one or more features described herein the mapping in the software of the vehicle is a logical mapping between each of the plurality of sensors and a variable in the software.

In addition to the one or more features described herein the one or more of the heating system and the cooling system are configured to control a temperature of a battery pack of the vehicle.

In one exemplary embodiment, a method for identifying mismatched sensors in a vehicle is provided. The method includes activating one or more of a heating system and a cooling system disposed in the vehicle, obtaining a series of readings from each of a plurality of sensors disposed in the vehicle, and inputting the series of readings from each of the plurality of sensors and an operational status of the one or more of the heating system and the cooling system into a trained machine learning model. The method also includes receiving an indication from the trained machine learning model an identification that two or more sensors from the plurality of sensors that are mismatched and updating a mapping of the two or more sensors in a software of the vehicle.

In addition to the one or more features described herein the plurality of sensors are temperature sensors.

In addition to the one or more features described herein the trained machine learning model is trained using historical readings from sensors disposed in a test vehicle and an operational status of heating system and cooling systems corresponding to the historical readings.

In addition to the one or more features described herein the series of readings from each of the plurality of sensors are obtained during a predetermined time period after activation of the one or more of the heating system and the cooling system.

In addition to the one or more features described herein the mapping in the software of the vehicle is a logical mapping between each of the plurality of sensors and a variable in the software.

In addition to the one or more features described herein the one or more of the heating system and the cooling system are configured to control a temperature of a battery pack of the vehicle.

In addition to the one or more features described herein the method also includes receiving from the trained machine learning model an identification of a check valve that has been improperly installed, wherein the check valve is disposed in a fluid pathway of the one or more of the heating system and the cooling system.

In one exemplary embodiment, a method for identifying an improperly installed check valve in a vehicle is provided. The method includes activating one or more of a heating system and a cooling system disposed in the vehicle, obtaining a series of readings from one or more sensors disposed in the vehicle, and identifying, for each of the one or more of sensors, a delta value from the series of readings. The method also includes comparing, for each of the one or more of sensors, the delta value to an expected delta value, identifying a check valve disposed in the vehicle that has been improperly installed based on differences between the delta values and the expected delta values, and generating an alert that identifies the check valve.

In addition to the one or more features described herein the one or more sensors include one or more of a pressure sensor, a temperature sensor, and a flow rate sensor.

In addition to the one or more features described herein the one or more sensors are disposed in a fluid pathway of the one or more of the heating system and the cooling system.

In addition to the one or more features described herein the check valve is configured to control a direction of flow in the fluid pathway.

In addition to the one or more features described herein the series of readings from each of the one or more sensors are obtained during a predetermined time period after activation of the one or more of the heating system and the cooling system.

In addition to the one or more features described herein the one or more of the heating system and the cooling system are configured to control a temperature of a battery pack of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
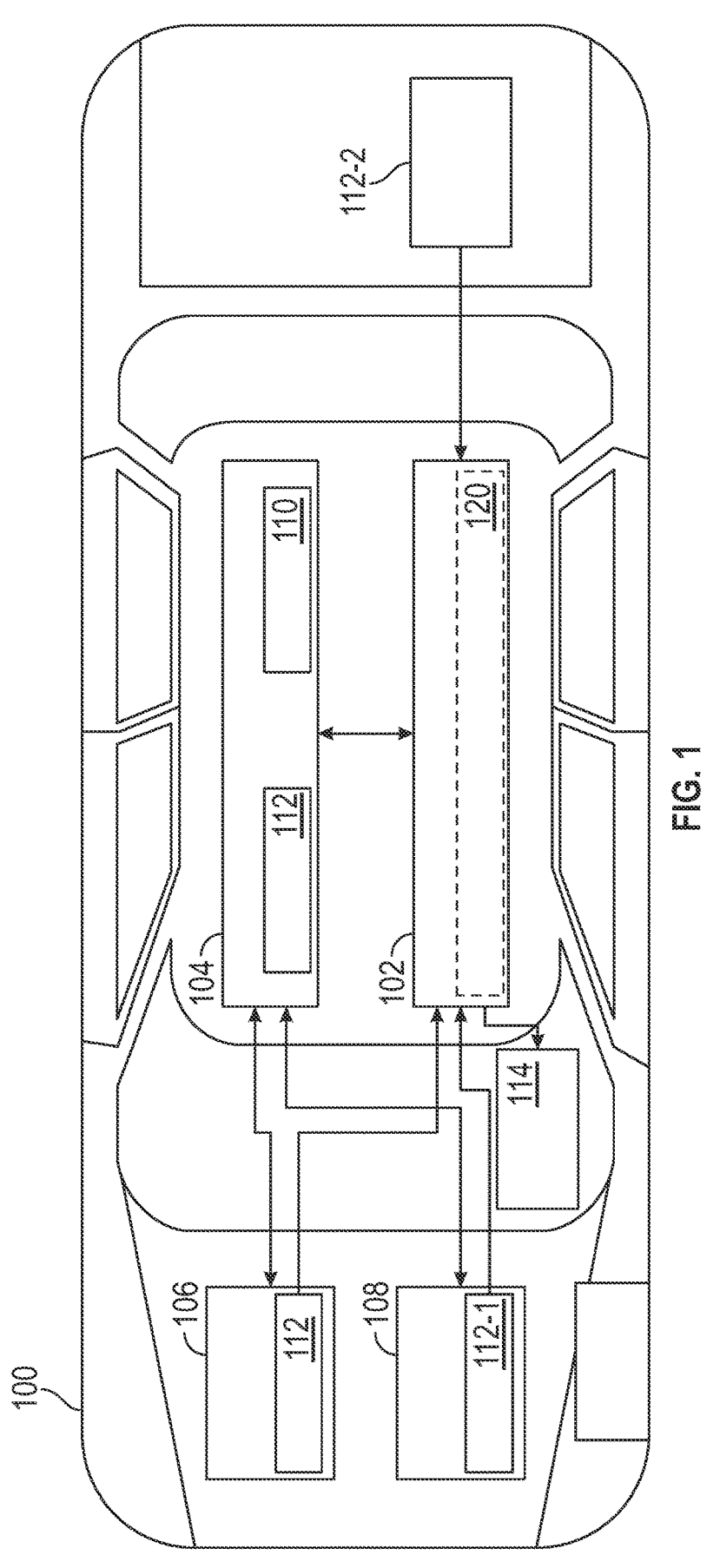
FIG. 1 is a schematic diagram of a vehicle in accordance with an exemplary embodiment.

The following description is merely exemplary in nature and is not intended to limit the present disclosure, its application or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include methods and systems for identifying improperly installed equipment in the heating and cooling systems of a vehicle. In exemplary embodiments, a processing system of a vehicle is configured to selectively operate the heating and cooling systems of a vehicle and to monitor readings of various sensors during the operation of the heating and cooling system. Based on the monitored changes to the readings of various sensors the processing system is configured to identify improperly installed equipment, (i.e., sensors or valves), of the heating and cooling system. In exemplary embodiments, the processing system utilizes various algorithms to identify mismatched sensors or improperly installed valves. In one embodiment, the processing system includes a trained machine learning system that is configured to identify mismatched sensors or improperly installed valves based on the operational status of the heating and cooling systems and the monitored changes to the readings of the sensors.

Referring now to FIG. 1, a schematic diagram of a vehicle 100 according to one or more embodiments is shown. The vehicle 100 may be an electric vehicle, an internal combustion vehicle, or a hybrid vehicle. The vehicle 100 includes a processing system 102 that is configured to control the operation of heating and cooling systems 104. In exemplary embodiments, the heating and cooling systems 104 are configured to selectively heat and/or cool various parts of the vehicle 100. These various parts of the vehicle include, but are not limited to, a battery 106 of the vehicle 100 and a passenger cabin 108 of the vehicle 100. In exemplary embodiments, the processing system 102 is one of a general-purpose processor, a Field programmable gate array (FPGA), an application-specific integrated circuit (ASIC), or the like.

In exemplary embodiments, the vehicle 100 also includes a user interface 114 that is configured to receive input from a user. For example, the user interface 114 may be used to selectively activate the heating and cooling systems 104. The user interface 114 may also include a display that is configured to display information regarding the operational status of the heating and cooling systems 104.

In exemplary embodiments, the vehicle 100 includes a plurality of sensors 112 that are configured to monitor one or more temperatures and pressures in various locations in the vehicle 100. For example, one of the sensors 112-1 is configured to monitor a temperature in the passenger cabin 108, one of the sensors 112 is configured to monitor a temperature of the battery 106, and another sensor 112-2 is configured to monitor an ambient temperature of the vehicle 100. In another example, one or more of the sensors 112 are configured to measure temperatures and pressures of various components of the heating and cooling systems 104.

In exemplary embodiments, the heating and cooling systems 104 of the vehicle 100 also include a plurality of valves 110 that are configured to control the flow of fluid through the heating and cooling systems 104. The operation of the valves 110 are controlled by the processing system 102 to effectuate the operation of the heating and cooling systems 104. In exemplary embodiments, the processing system 102 is configured to receive input from the sensors 112, receive input from the user interface 114, and responsively control the operation of the heating and cooling system 104 including the valves 110.

In exemplary embodiments, the processing system 102 is configured to execute various algorithms to identify mismatched sensors or improperly installed valves. In one embodiment, the processing system 102 is configured to control the operation of the heating and cooling system 104 of the vehicle 100 and to monitor changes to the output of sensors 112 during the operation of the heating and cooling system. Based on the monitored changes to the output of various sensors, the processing system 102 is configured to identify improperly installed equipment, (i.e., sensors or valves), of the heating and cooling system. In one example, the processing system 102 receives temperature readings from a first sensor 112-1 which is logically associated with the interior of the passenger cabin 108 of the vehicle 100, and a second sensor 112-2 which is logically associated with the exterior of the vehicle 100. However, when the processing system 102 instructs the heating and cooling system 104 to cool the cabin 108 of the vehicle 100, the readings from the first sensor 112-1 remain constant while the readings from the second sensor 112-2 decrease. Likewise, when the processing system 102 instructs the heating and cooling system 104 to heat the cabin 108 of the vehicle 100, the readings from the first sensor 112-1 remain constant while the readings from the second sensor 112-2 increase. Accordingly, the processing system 102 identifies that the first sensor 112-1 and the second sensor 112-2 have been mismatched, (i.e., the mapping of the physical locations of the sensors has been improperly reversed). In exemplary embodiments, the processing system 102 is configured to update a mapping of sensors that have been identified as being mismatched in the software of the vehicle 100.

In one embodiment, the processing system 102 includes a trained machine learning system 120 that is configured to identify mismatched sensors or improperly installed valves based on the operational status of the heating and cooling systems 104 and the monitored changes to the output of the sensors 112. Although the trained machine learning system 120 is depicted as being part of the processing system 102, it will be clear to those of ordinary skill in the art that the trained machine learning system 120 may be separate from the processing system 102 and may be in communication with the processing system 102. For example, the trained machine learning system 120 may be disposed on a diagnostic tool that can be selectively connected to the vehicle 100 to communicate with the processing system 102.

Figure 2:
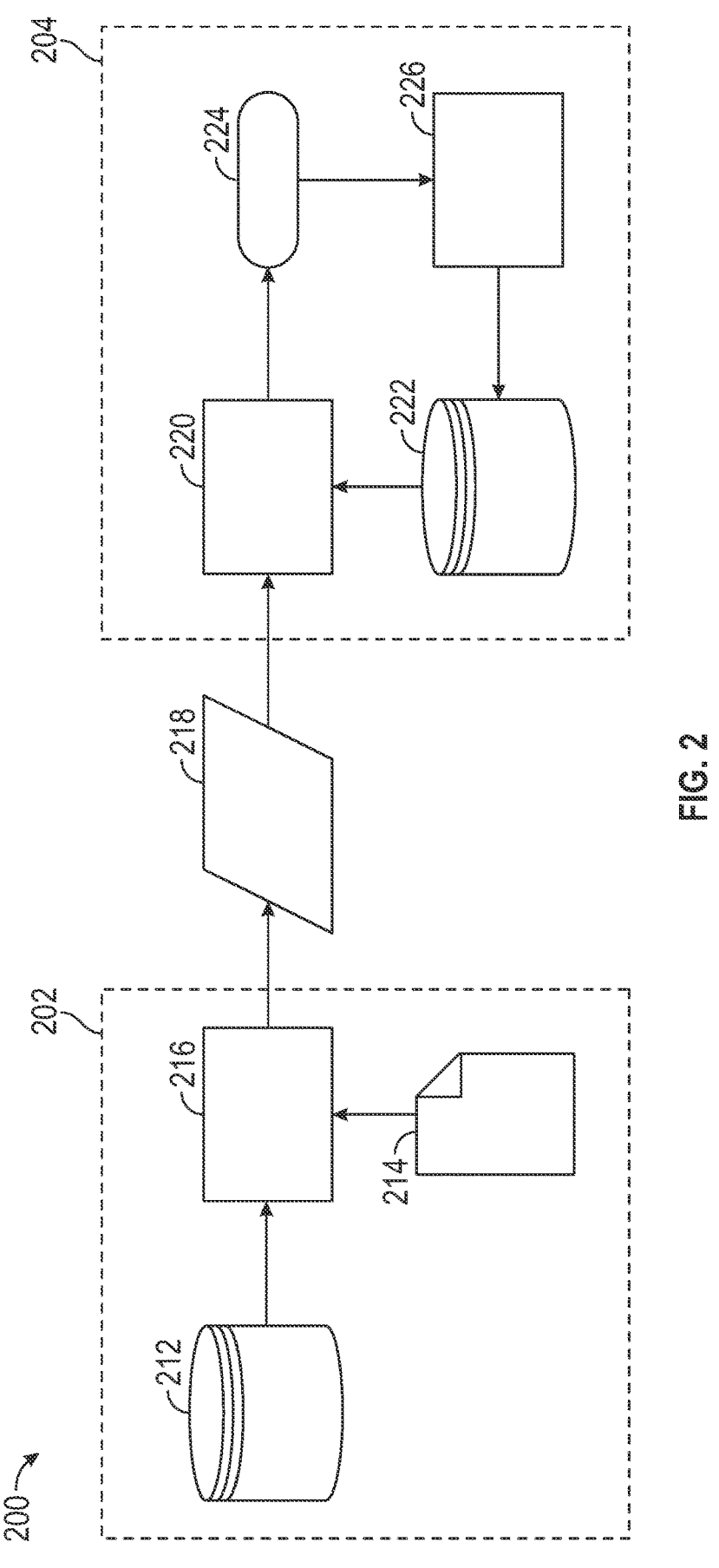
FIG. 2 depicts a block diagram of components of a machine learning training and inference system in accordance with an exemplary embodiment.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as identifying improperly installed equipment in the heating and cooling system of a vehicle. Inference 204 is the process of implementing the trained model 218 to perform the task, such as identifying improperly installed equipment in a heating and cooling system of a vehicle, in the context of a larger system (e.g., a system 226). All or a portion of the system 200 shown in FIG. 2 can be implemented, for example by all or a subset of the processing system 102 of FIG. 1.

The training 202 begins with training data 212, which may be structured or unstructured data. According to one or more embodiments described herein, the training data 212 includes the operational status of a heating and cooling system of a test vehicle and data collected from sensors of the vehicle during the operation of the heating and cooling system, where the heating and cooling system is functioning properly. The training engine 216 receives the training data 212 and a model form 214. The model form 214 represents an untrained base model. The model form 214 can have preset weights and biases, which can be adjusted during training. It should be appreciated that the model form 214 can be selected from many different model forms depending on the task to be performed. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on the results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as identifying improperly installed equipment in a heating and cooling system of a vehicle. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, take an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figures 3, 4:
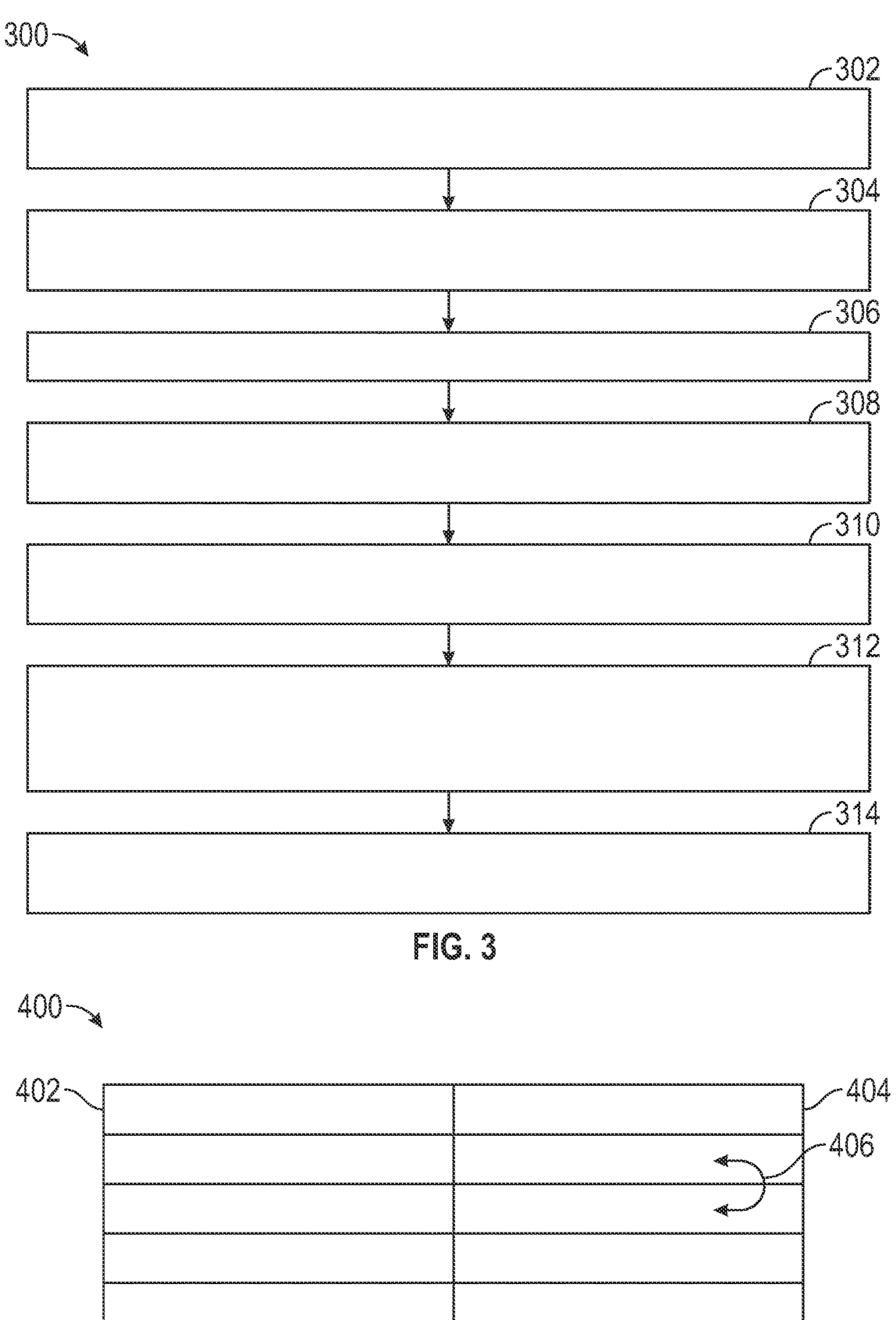
FIG. 3 is a flowchart illustrating a method for identifying mismatched sensors in a vehicle in accordance with an exemplary embodiment.
FIG. 4 depicts a block diagram of a mapping of physical sensor identifications to logical sensor identifications in accordance with an exemplary embodiment.

Referring now to FIG. 3, a flowchart illustrating a method 300 for identifying mismatched sensors in a vehicle in accordance with an exemplary embodiment is shown. In exemplary embodiments, the method 300 is performed by a processing system 102, such as the one shown in FIG. 1. The method 300 begins at block 302 by obtaining an initial reading from each of a plurality of sensors disposed in the vehicle. In exemplary embodiments, the plurality of sensors includes one or more temperature sensors and/or pressure sensors. Next, at block 304, the method 300 includes activating one or more of a heating system and a cooling system disposed in the vehicle. In one embodiment, the one or more of the heating system and the cooling system are configured to control the temperature of a battery pack of the vehicle.

After the heating system and/or the cooling system are activated, the method 300 includes obtaining a series of readings from each of the plurality of sensors, at block 306. In exemplary embodiments, the series of readings from each of the plurality of sensors are obtained during a predetermined time period after activation of the one or more of the heating system and the cooling system. At block 308, the method 300 includes identifying, for each of the plurality of sensors, a delta value from the series of readings. In one embodiment, the delta value for the series of readings is an average change from the initial reading to the series of readings during the predetermined time period. In another embodiment, the delta value for the series of readings is the largest observed change from the initial reading to the series of readings predetermined time period.

At block 310, the method 300 includes comparing, for each of the plurality of sensors, the delta value to an expected delta value. In exemplary embodiments, the expected delta value for each of the plurality of sensors is an expected change of the measured value of the sensor based on the operating mode of the heating and cooling system. In one embodiment, the expected delta values for each of the plurality of sensors is a constant value that is set by the manufacturer of the vehicle. At block 312, the method 300 includes identifying two or more sensors from the plurality of sensors that have been mismatched based on differences between the delta values and the expected delta values.

In one embodiment, identifying two or more sensors from the plurality of sensors that have been mismatched based on the differences between the delta values and the expected delta values includes identifying a first sensor of the plurality of sensors that has a first delta value that is not within a first threshold range of a first expected delta value and identifying a second sensor of the plurality of sensors that has a second delta value that is not within a second threshold range of a second expected delta value. Identifying the mismatched sensors also includes determining that the first delta value is within the second threshold range of the second expected delta value and that the second delta value is within the first threshold range of the first expected delta value. In exemplary embodiments, the first threshold range and the second threshold range are different.

At block 314, the method 300 includes updating a mapping of the two or more sensors in the software of the vehicle. In one embodiment, the mapping in the software of the vehicle is a logical mapping between each of the plurality of sensors and a variable in the software.

Referring now to FIG. 4, a block diagram of a mapping 400 of physical sensor identifications to logical sensor identifications in accordance with an exemplary embodiment is shown. As illustrated, the mapping 400 includes a correspondence between a physical sensor identification 402 to a logical sensor identification 404. In one embodiment, the physical sensor identification 402 is associated with a physical port that is used to connect a sensor to vehicle. In one embodiment, the logical sensor identification 404 is a software variable that is associated a sensor connected to the vehicle. In exemplary embodiments, updating the mapping 400 may include swapping 406 the logical sensor identification 404 associated with the physical sensor identification 402.

Figure 5:
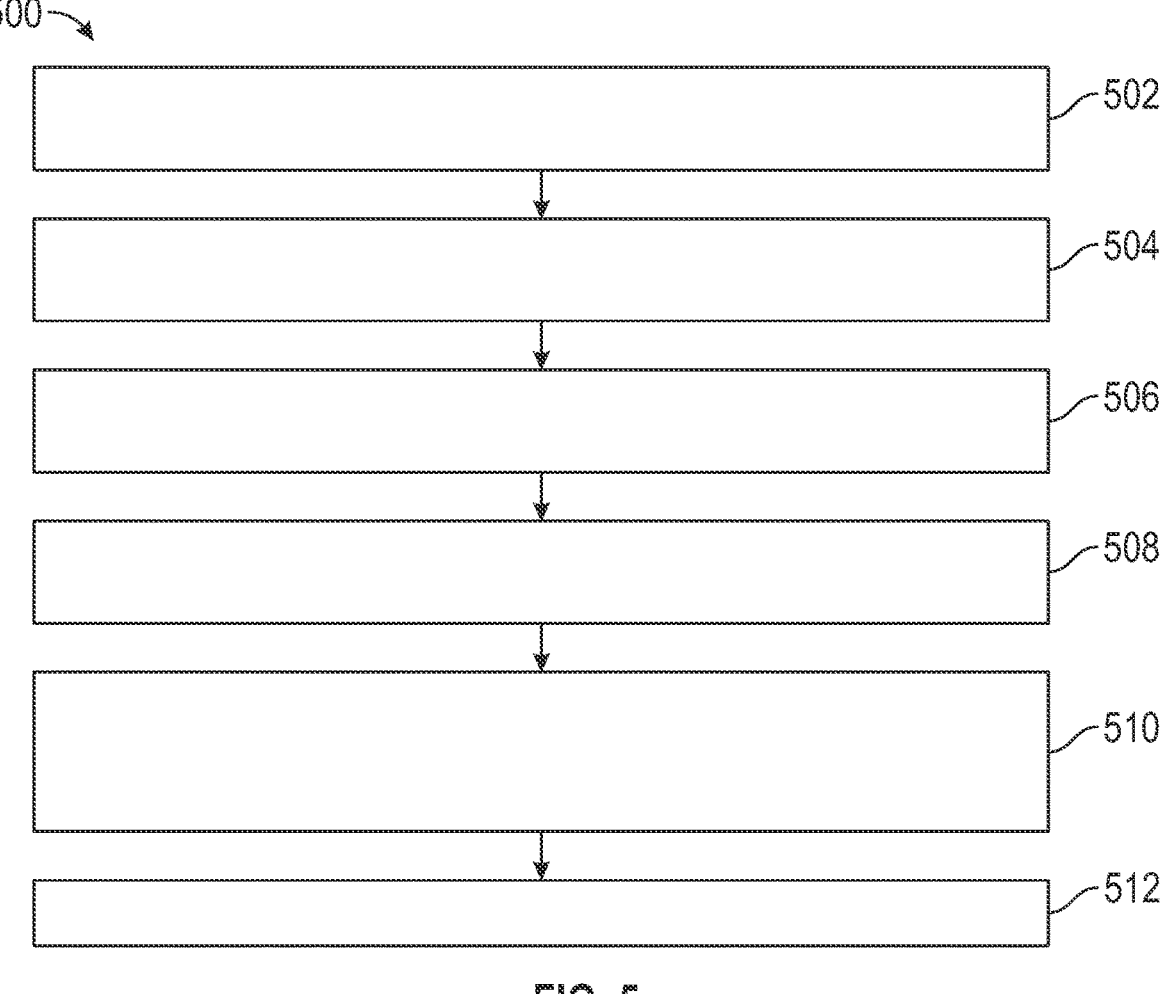
FIG. 5 is a flowchart illustrating a method for identifying an improperly installed check valve in a vehicle in accordance with an exemplary embodiment.
Figure 6A:
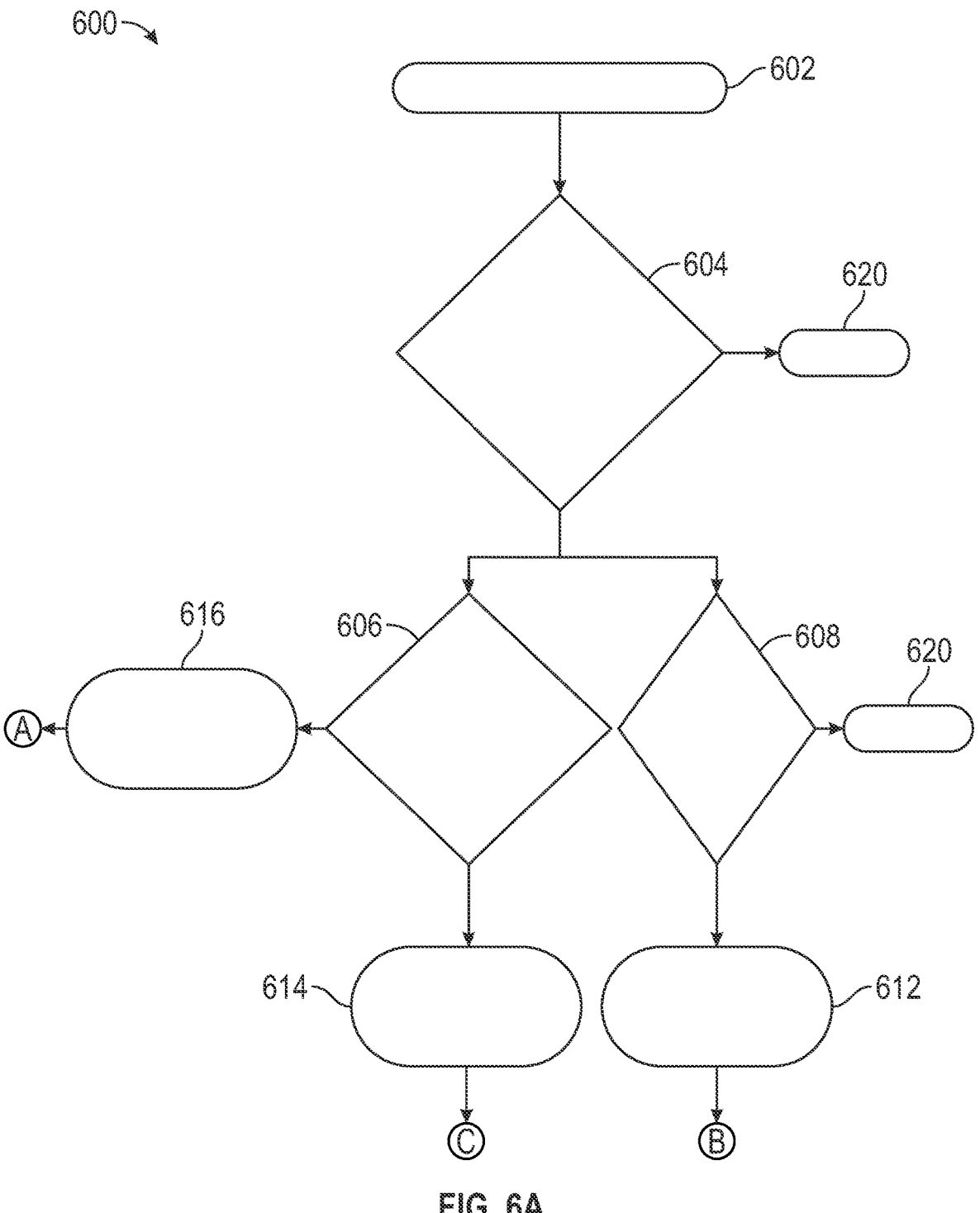
FIGS. 6A, 6B, 6C, and 6D are flowcharts illustrating a method for identifying mismatched sensors in a vehicle in accordance with an exemplary embodiment.
Figure 6B:
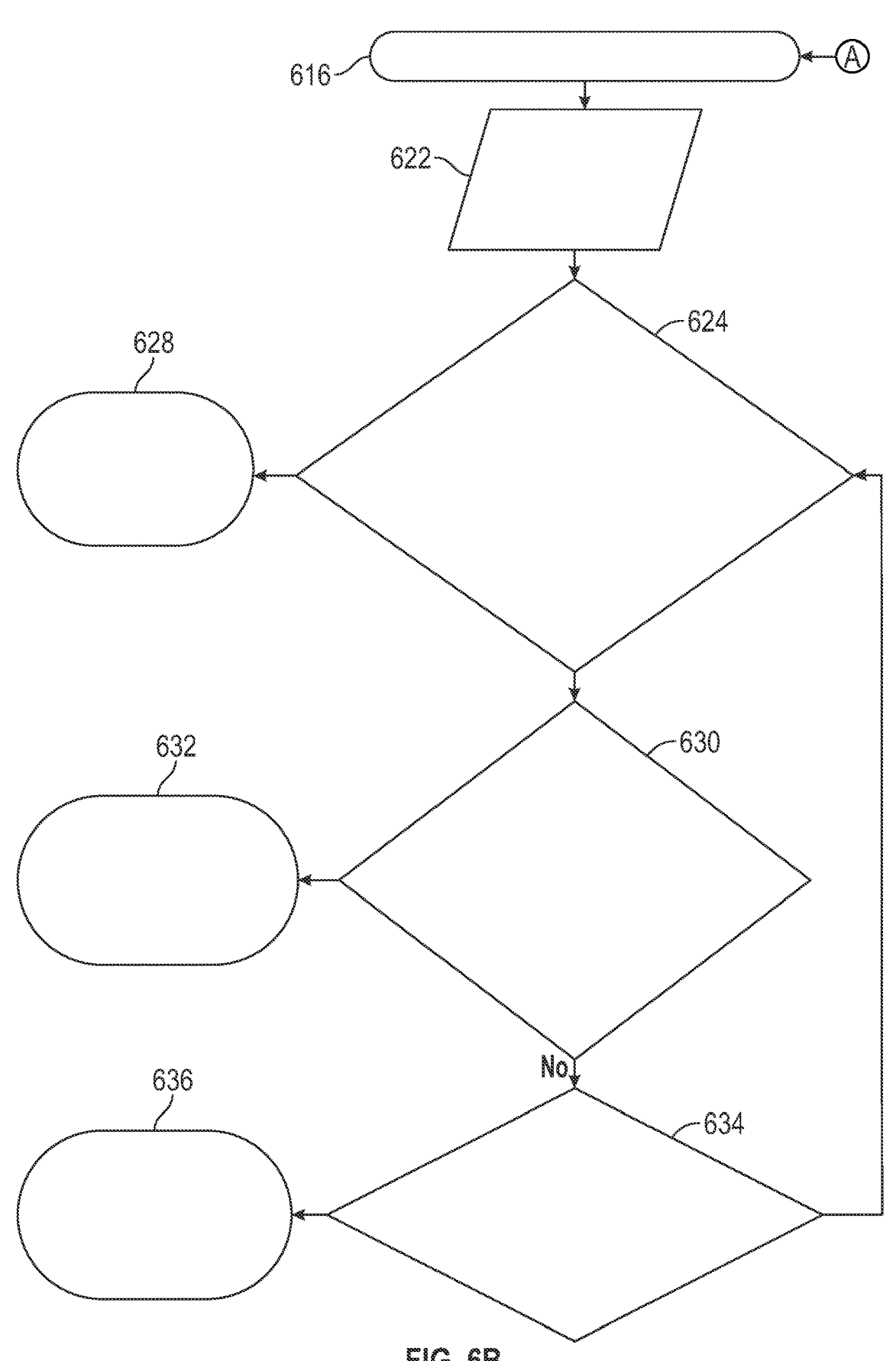
Figure 6C:
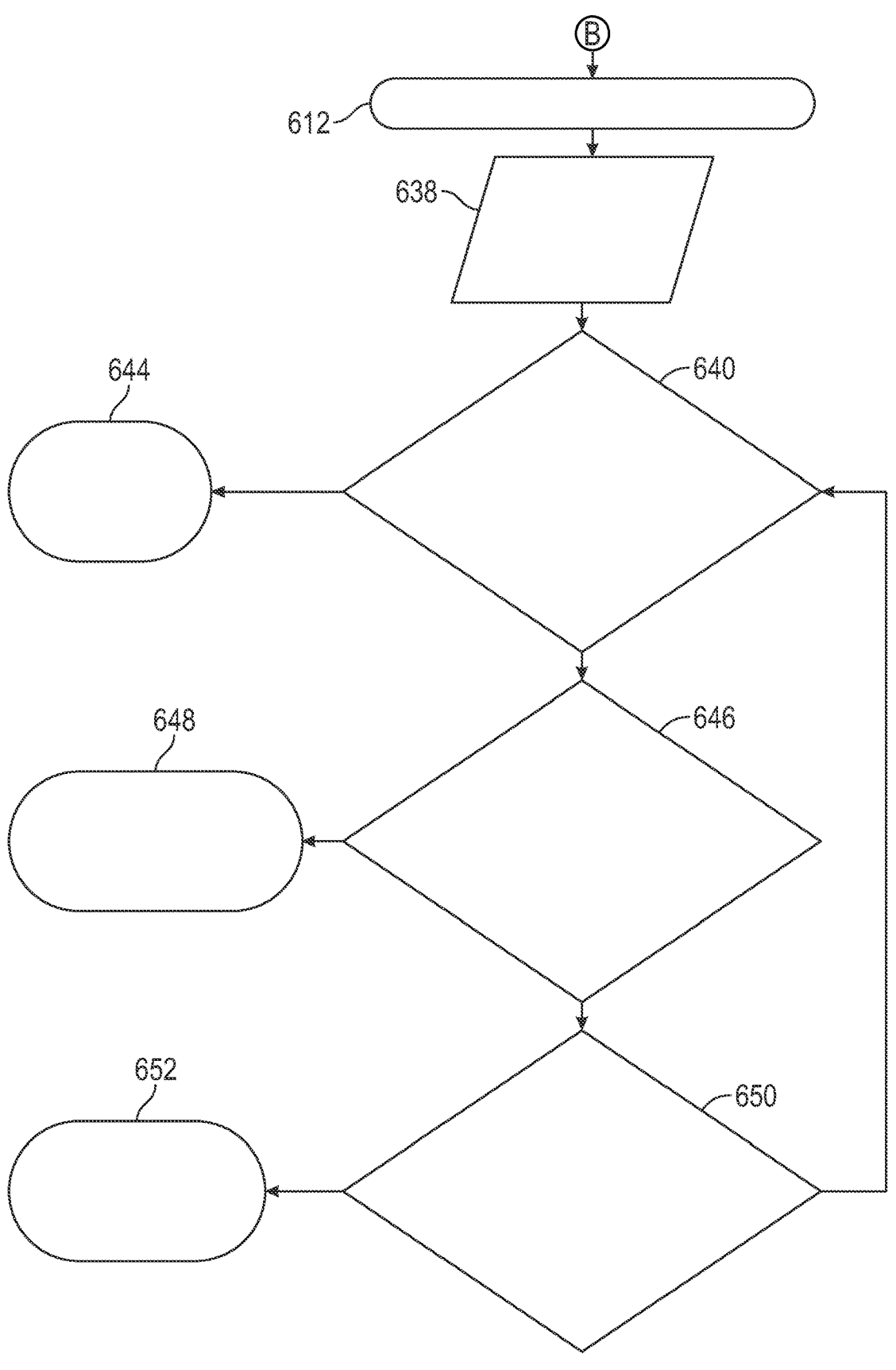
Figure 6D:
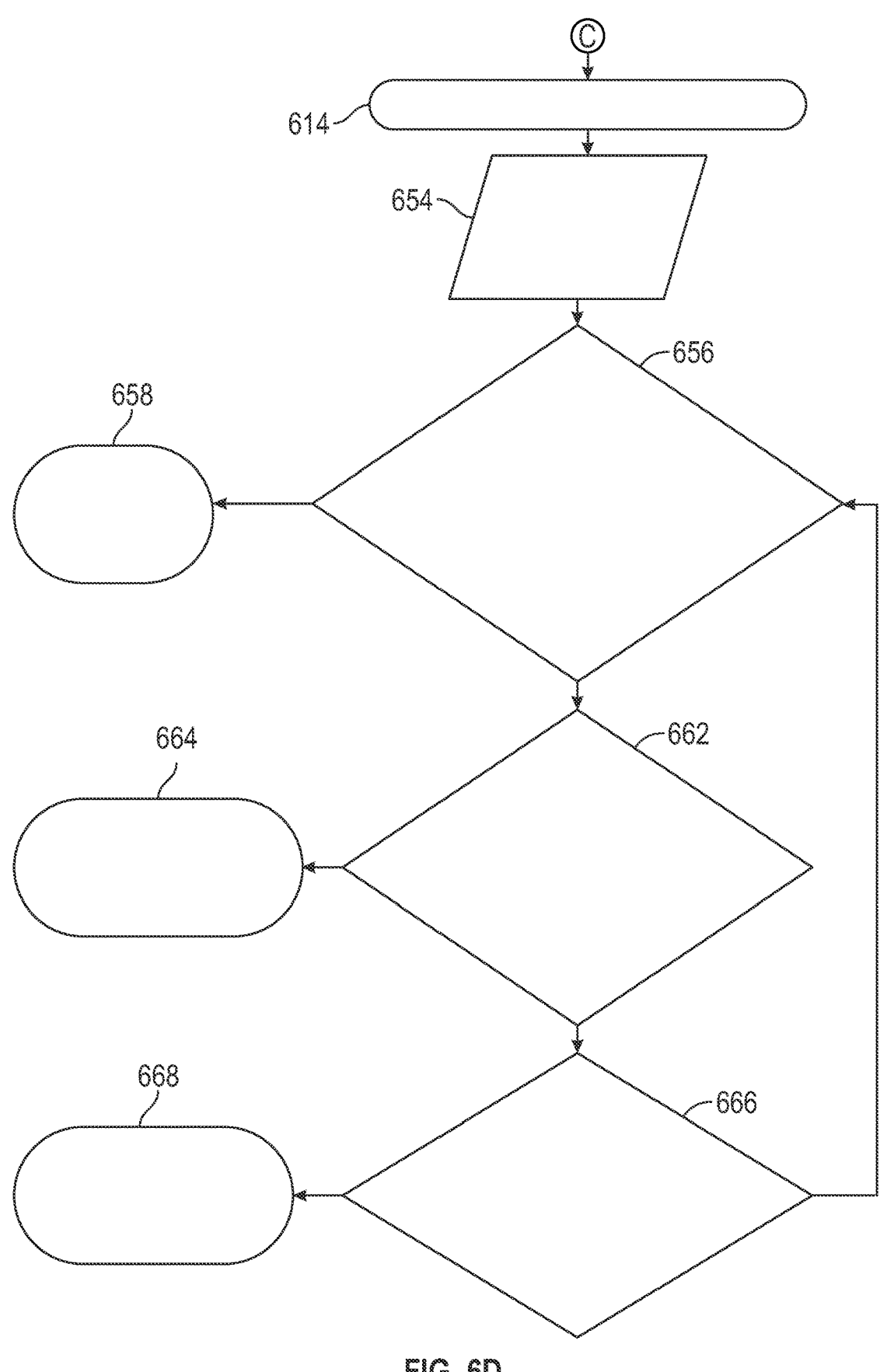

Referring now to FIG. 5, a flowchart illustrating a method 500 for identifying an improperly installed check valve in a vehicle in accordance with an exemplary embodiment is shown. In exemplary embodiments, the method 500 is performed by a processing system 102, such as the one shown in FIG. 1. At block 502, the method 500 includes activating one or more of a heating system and a cooling system disposed in the vehicle. Next, at block 504 the method 500 includes obtaining a series of readings from one or more sensors disposed in the vehicle. In exemplary embodiments, the series of readings from each of the one or more sensors are obtained during a predetermined time period after activation of the one or more of the heating system and the cooling system. In one embodiment, the one or more of the heating system and the cooling system are configured to control a temperature of a battery pack of the vehicle. In one embodiment, the one or more sensors include one or more of a pressure sensor, a temperature sensor, and a flow rate sensor. In one embodiment, the one or more sensors are disposed in a fluid pathway of the one or more of the heating system and the cooling system.

Next, at block 506, the method 500 includes identifying, for each of the one or more of sensors, a delta value from the series of readings. In one embodiment, the delta value for the series of readings of a sensor is the total change of the readings of the sensor in the series of readings, (i.e., the largest reading of the sensor in the series of readings minus the smallest reading of the sensor in the series of readings). In another embodiment, the delta value for the series of readings is the largest observed change from an initial reading of the sensor to the readings in the series of readings. At block 508, the method 500 includes comparing, for each of the one or more of sensors, the delta value to an expected delta value. In exemplary embodiments, the expected delta value for each of the plurality of sensors is an expected change of the measured value of the sensor based on the operating mode of the heating and cooling system.

Next, at block 510, the method 500 includes identifying a check valve disposed in the vehicle that has been improperly installed based on differences between the delta values and the expected delta values. In one example, a check valve is identified as being improperly installed based on a determination that the difference between a delta value of one or more of the sensors deviates from their corresponding expected delta values by more than a threshold value. In exemplary embodiments, the check valve is configured to control the direction of flow in the fluid pathway. Once a check valve disposed in the vehicle is identified as being improperly installed, the method 500 proceeds to block 512 and includes generating an alert that identifies the check valve.

Referring now to FIGS. 6A, 6B, 6C, and 6D, a flowchart illustrating a method 600 for identifying mismatched sensors in a vehicle in accordance with an exemplary embodiment is shown. In exemplary embodiments, the method 600 is performed by a processing system 102, such as the one shown in FIG. 1. At block 602, the method 600 includes receiving a command to start a diagnostic process to identify mismatched sensors. Next, at decision block 604, the method 600 determines whether the vehicle is in a service mode. Based on a determination that the vehicle is not in a service mode, the method 600 proceeds to block 620, and the diagnostic process is not performed. At decision block 608, the method 600 includes determining whether a battery cooling process is being performed. If the battery cooling process is not being performed, the method 600 proceeds to block 620, and the diagnostic process is not performed. If the battery cooling process is being performed, the method 600 proceeds to block 612 and enables a diagnostic process for detecting mismatched sensors in a battery cooling system.

At decision block 606, the method 600 includes determining whether the ambient temperature of the vehicle is within a threshold range. If the ambient temperature of the vehicle is within the threshold value, the method 600 proceeds to block 614 and enables a diagnostic process for detecting mismatched sensors by heating the cabin. If the ambient temperature of the vehicle is not within the threshold range, the method 600 proceeds to block 616 and enables a diagnostic process for detecting mismatched sensors by cooling the cabin.

At block 622, the method 600 includes opening a chiller expansion valve and an evaporator expansion valve and closing an external condenser flow valve and a condenser heater flow valve. Next, at decision block 624, the method 600 includes determining whether a reading of the condenser heater temperature sensor is increasing, a front evaporator and external condenser temperature sensor remain approximately constant, and a refrigerant chiller out temperature sensor is within a threshold range of the coolant chiller out temperature sensor. If so, the temperature sensors are functioning as expected and the method 600 proceeds to block 628. Otherwise, the temperature sensors are not functioning as expected and the method 600 proceeds to decision block 630.

At decision block 630, the method 600 includes determining whether the condenser heater temperature sensor is within a threshold range of a coolant chiller out temperature sensor and a reading from the refrigerant chiller out temperature sensor is increasing. If so, the method 600 proceeds to block 632 and identifies that the condenser heater temperature sensor and the refrigerant chiller out temperature sensors are mismatched. Otherwise, the method 600 proceeds to decision block 634 and determines whether the reading from a condenser heater temperature sensor remains approximately constant and the reading of the front evaporator temperature is increasing. If so, the method 600 proceeds to block 636 and identifies that the condenser heater temperature sensor and the front evaporator temperature sensor are mismatched.

At block 638, the method 600 includes closing a condenser heater flow valve and a chiller expansion valve and opening an evaporator expansion valve and an external condenser flow valve. Next, at decision block 640, the method 600 includes determining whether the readings of the front evaporator temperature sensor are decreasing and whether the readings of the chiller out temperature sensor and the heater condenser temperature sensors remain approximately constant. If so, the temperature sensors are functioning as expected and the method 600 proceeds to block 644. Otherwise, the temperature sensors are not functioning as expected and the method 600 proceeds to decision block 646.

At decision block 646, the method 600 includes determining whether readings from the chiller out temperature sensor are decreasing and readings from the front evaporator temperature sensor remain approximately constant. If so, the method 600 proceeds to block 648 and identifies that the chiller out temperature sensor and front evaporator temperature sensor are mismatched. Otherwise, the method 600 proceeds to decision block 650 and determines whether readings of the heater condenser temperature sensor are decreasing and readings from the front evaporator temperature sensor remain approximately constant. If so, the method 600 proceeds to block 652 and identifies the heater condenser temperature sensor and the front evaporator temperature sensors as being mismatched.

At block 654, the method 600 includes closing an evaporator expansion valve and a condenser heater flow valve, and opening an external condenser flow valve and a chiller expansion valve. Next, at decision block 656, the method 600 includes determining whether the reading of a refrigerant chiller out temperature sensor is within a threshold range of the reading of the coolant temperature sensor and whether the reading of the front evaporator temperature sensor and the heater condenser temperature sensors remain approximately constant. If so, the temperature sensors are functioning as expected and the method 600 proceeds to block 658. Otherwise, the temperature sensors are not functioning as expected and the method 600 proceeds to decision block 662.

At decision block 662, the method 600 includes determining whether the reading of the front evaporator temperature sensor is within a threshold range of the reading of the coolant chiller out temperature sensor and whether the refrigerant chiller out temperature sensor remains approximately constant. If so, the method 600 proceeds to block 664 and identifies that the refrigerant chiller out sensor and front evaporator temperature sensor are mismatched. Otherwise, the method 600 proceeds to decision block 666 and determines whether the reading of the heater condenser sensor is within a threshold range of the reading of the coolant chiller out sensor and that readings of the refrigerant chiller out remains approximately constant. If so, the method 600 proceeds to block 668 and identifies the refrigerant chiller out sensor and heater condenser temperature sensor as being mismatched.

Figure 7A:
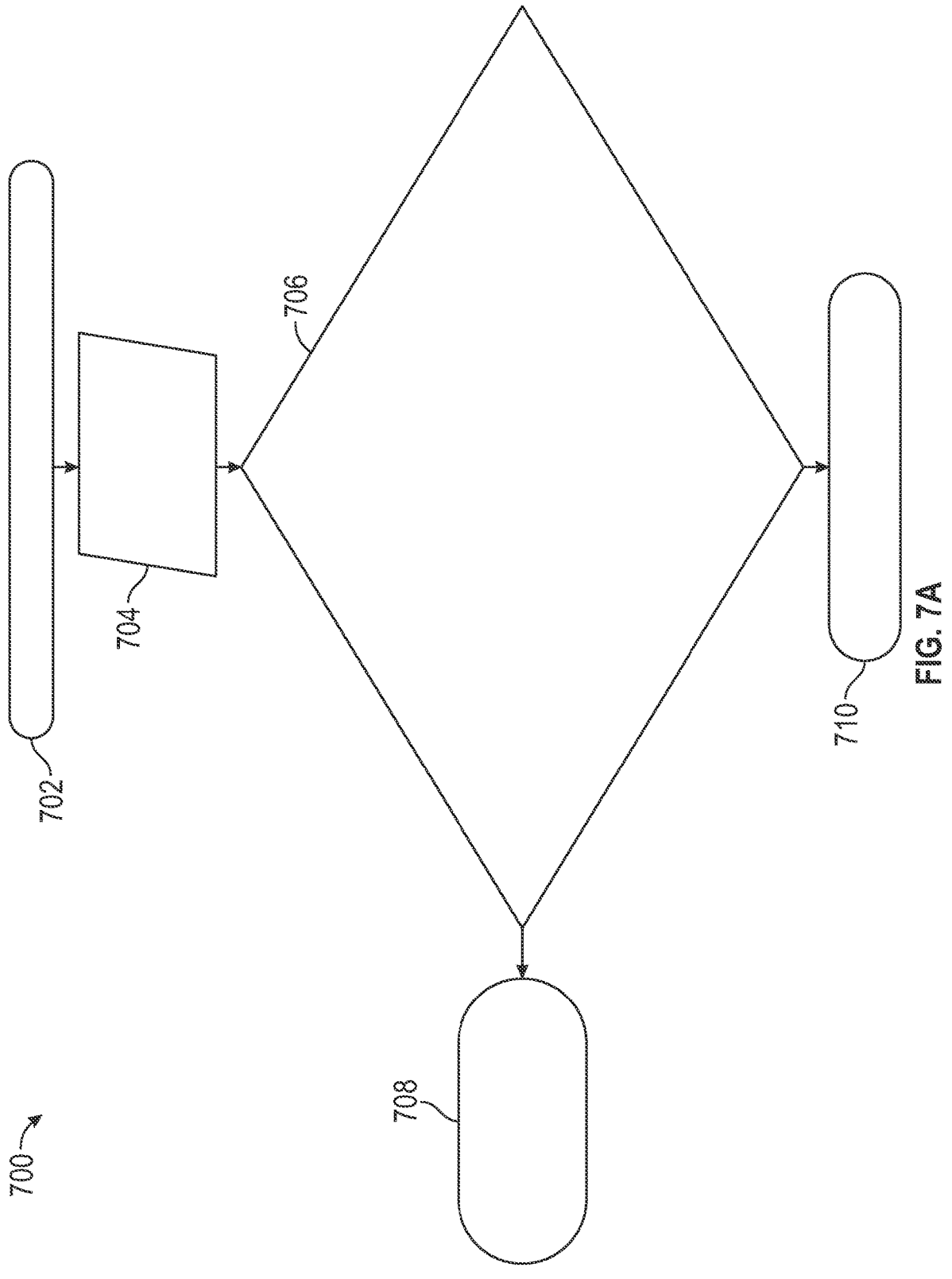
FIGS. 7A and 7B are flowcharts illustrating methods for identifying an improperly installed check valve in a vehicle in accordance with exemplary embodiments.

Referring now to FIG. 7A a flowchart illustrating a method 700 for identifying an improperly installed check valve in a vehicle in accordance with an exemplary embodiment is shown. In exemplary embodiments, the method 700 is performed by a processing system 102, such as the one shown in FIG. 1. At block 702, the method 700 includes enabling a cabin cooling check valve diagnostic process. Next, at block 704 the method 700 includes setting an evaporator expansion valve and a condenser flow valve to be more than ten percent open and setting a heater flow valve and a chiller expansion valve to be less than ten percent open. Next, at decision block 706, the method 700 includes determining whether a difference between the readings of a compressor out temperature sensor and an expansion valve in temperature sensor is greater than a threshold, a difference between the readings of a compressor out temperature sensor and an external condenser out temperature sensor is greater than a threshold, and the readings between the readings of a compressor mass flow sensor and an external condenser sensor is greater than a threshold. If all of these conditions are true, the method 700 proceeds to block 708, and an incorrect orientation is detected for the external condenser check valve. Otherwise, the method proceeds to block 710 and an incorrect orientation is not detected for the external condenser check valve.

Figure 7B:
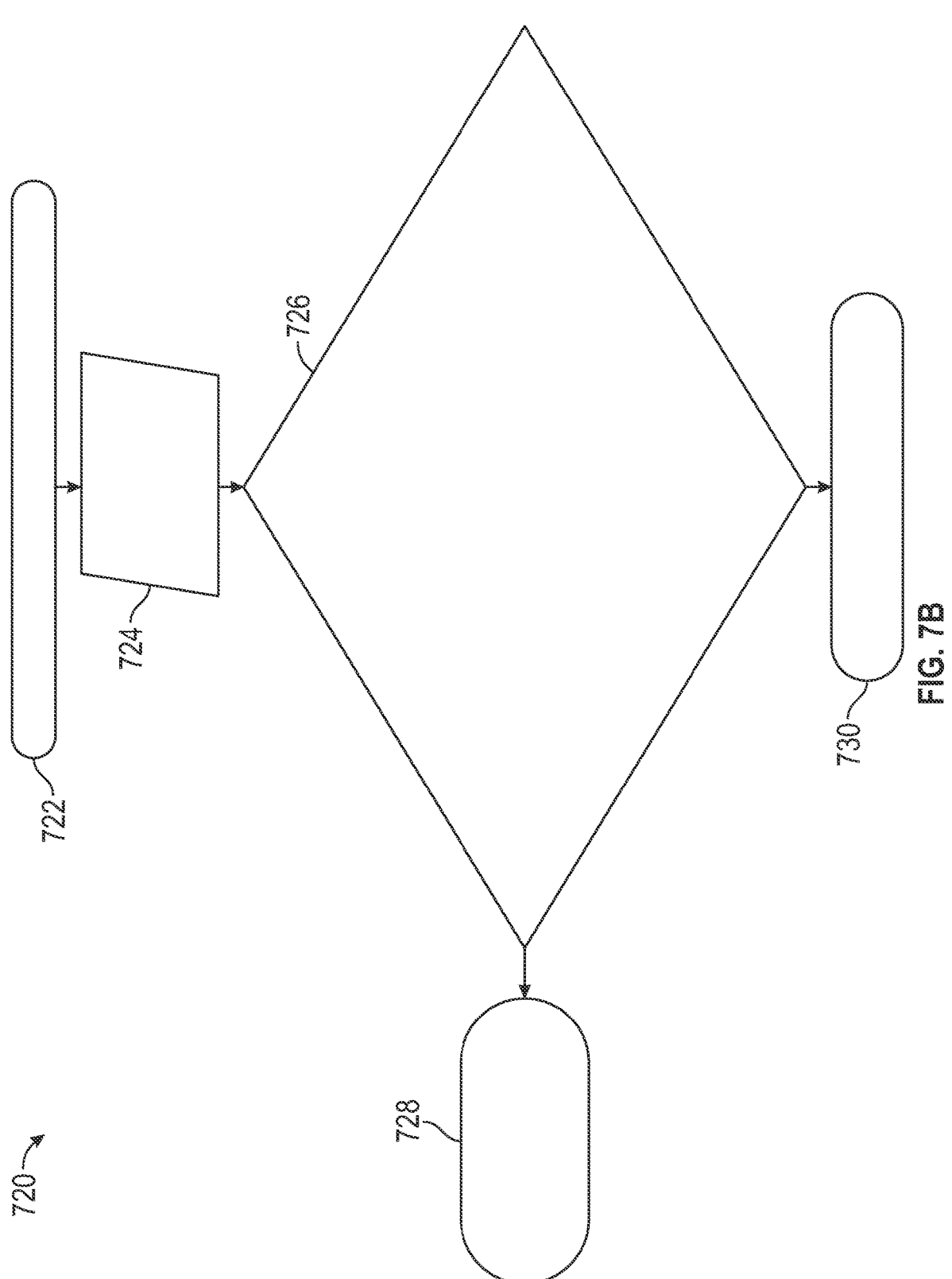

Referring now to FIG. 7B a flowchart illustrating a method 720 for identifying an improperly installed check valve in a vehicle in accordance with an exemplary embodiment is shown. In exemplary embodiments, the method 720 is performed by a processing system 102, such as the one shown in FIG. 1. At block 722, the method 720 includes enabling a cabin heating check valve diagnostic process. Next, at block 724 the method 720 includes setting an evaporator expansion valve and a condenser flow valve to be less than ten percent open and setting a heater flow valve and a chiller expansion valve to be more than ten percent open. Next, as shown at decision block 726, the method 720 includes determining whether a difference between the readings of a compressor out temperature sensor and expansion valve in temperature sensor is greater than a threshold, a difference between the readings of a compressor out temperature sensor and cabin heating condenser out temperature sensor is greater than a threshold, and a difference between the readings of a compressor mass flow sensor and cabin heating condenser sensor is greater than a threshold. If all of these conditions are true, the method 720 proceeds to block 728, and an incorrect orientation is detected for the cabin heating condenser check valve. Otherwise, the method proceeds to block 730 and an incorrect orientation is not detected for the cabin heating condenser check valve.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for identifying mismatched sensors in a vehicle, the method comprising:
   obtaining an initial reading from each of a plurality of sensors disposed in the vehicle;
   activating one or more of a heating system and a cooling system disposed in the vehicle;
   obtaining a series of readings from each of the plurality of sensors;
   identifying, for each of the plurality of sensors, a delta value from the series of readings;
   comparing, for each of the plurality of sensors, the delta value to an expected delta value;
   identifying two or more sensors from the plurality of sensors that have been mismatched based on differences between the delta values and the expected delta values; and
   updating a mapping of the two or more sensors in a software of the vehicle,
   wherein the plurality of sensors are temperature sensors.

2. The method of claim 1, wherein identifying two or more sensors from the plurality of sensors that have been mismatched based on the differences between the delta values and the expected delta values comprises:
   identifying a first sensor of the plurality of sensors that has a first delta value that is not within a first threshold range of a first expected delta value;
   identifying a second sensor of the plurality of sensors that has a second delta value that is not within a second threshold range of a second expected delta value; and
   determining that the first delta value is within the second threshold range of the second expected delta value and that the second delta value is within the first threshold range of the first expected delta value.

3. The method of claim 2, wherein the first threshold range and the second threshold range are different.

4. The method of claim 1, wherein the series of readings from each of the plurality of sensors are obtained during a predetermined time period after activation of the one or more of the heating system and the cooling system.

5. The method of claim 1, wherein the mapping in the software of the vehicle is a logical mapping between each of the plurality of sensors and a variable in the software.

6. The method of claim 1, wherein the one or more of the heating system and the cooling system are configured to control a temperature of a battery pack of the vehicle.

7. The method of claim 1, further comprising generating a notification to a user interface of the vehicle indicating the identification of the mismatched sensors.

8. A method for identifying mismatched sensors in a vehicle, the method comprising:
   activating one or more of a heating system and a cooling system disposed in the vehicle;
   obtaining a series of readings from each of a plurality of sensors disposed in the vehicle;
   inputting the series of readings from each of the plurality of sensors and an operational status of the one or more of the heating system and the cooling system into a trained machine learning model;
   receiving an indication from the trained machine learning model an identification that two or more sensors from the plurality of sensors that are mismatched; and
   updating a mapping of the two or more sensors in a software of the vehicle.

9. The method of claim 8, wherein the plurality of sensors are temperature sensors.

10. The method of claim 8, wherein the trained machine learning model is trained using historical readings from sensors disposed in a test vehicle and an operational status of heating system and cooling systems corresponding to the historical readings.

11. The method of claim 8, wherein the series of readings from each of the plurality of sensors are obtained during a predetermined time period after activation of the one or more of the heating system and the cooling system.

12. The method of claim 8, wherein the mapping in the software of the vehicle is a logical mapping between each of the plurality of sensors and a variable in the software.

13. The method of claim 8, wherein the one or more of the heating system and the cooling system are configured to control a temperature of a battery pack of the vehicle.

14. The method of claim 8, further comprising receiving from the trained machine learning model an identification of a check valve that has been improperly installed, wherein the check valve is disposed in a fluid pathway of the one or more of the heating system and the cooling system.

15. A method for identifying an improperly installed check valve in a vehicle, the method comprising:

activating one or more of a heating system and a cooling system disposed in the vehicle;

obtaining a series of readings from one or more sensors disposed in the vehicle;

identifying, for each of the one or more of sensors, a delta value from the series of readings;

comparing, for each of the one or more of sensors, the delta value to an expected delta value;

identifying a check valve disposed in the vehicle that has been improperly installed based on differences between the delta values and the expected delta values; and generating an alert that identifies the check valve.

16. The method of claim 15, wherein the one or more sensors include one or more of a pressure sensor, a temperature sensor, and a flow rate sensor.

17. The method of claim 15, wherein the one or more sensors are disposed in a fluid pathway of the one or more of the heating system and the cooling system.

18. The method of claim 17, wherein the check valve is configured to control a direction of flow in the fluid pathway.

19. The method of claim 15, wherein the series of readings from each of the one or more sensors are obtained during a predetermined time period after activation of the one or more of the heating system and the cooling system.

20. The method of claim 15, wherein the one or more of the heating system and the cooling system are configured to control a temperature of a battery pack of the vehicle.

* * * * *